Patented Apr. 17, 1951

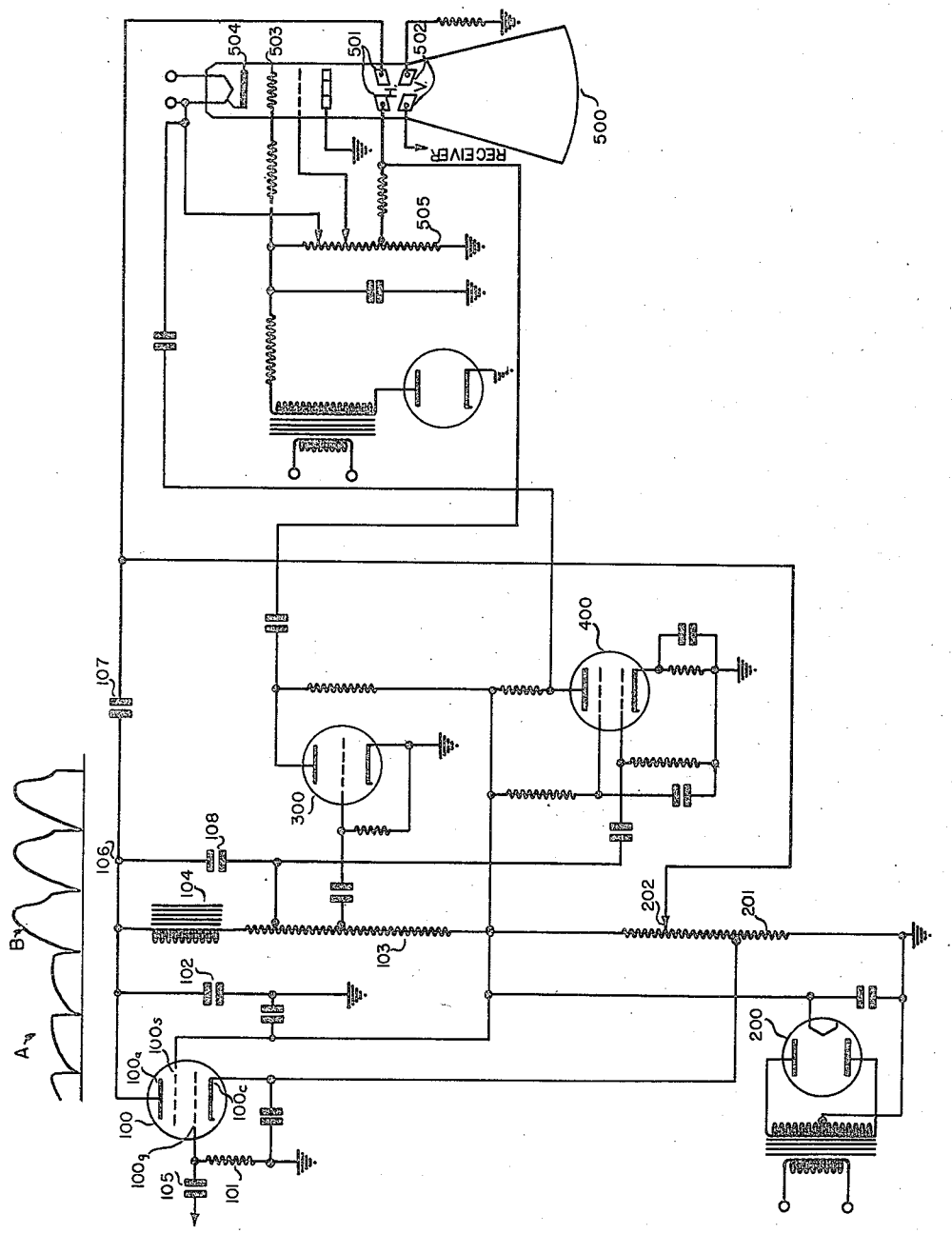

2,548,907

UNITED STATES PATENT OFFICE 2,548,907

SWEEP SYSTEM

La Verne R. Philpott, Washington, D. C.

Application April 19, 1944, Serial No. 531,773

2 Claims. (Cl. 315—22)

(Granted under the act of March 3, 1883, as amended April 30, 1928; 370 O. G. 757)

This invention relates to a system for measuring small intervals of time with great accuracy, and it is particularly concerned with a method for providing an expanded cathode ray sweep especially for use in radio echo range finding systems.

The customary method of measuring small time intervals, such as those occurring between transmission of a radio pulse and reception of an echo thereof from nearby objects, is to impress the received echo on the trace of a cathode ray as a deflection during the sweep along the time axis. The sweep of the ray is ordinarily provided by the application of a saw-tooth voltage wave to one set of electrostatic deflection plates in the cathode ray tube, the wave being synchronized with the transmission of the radio pulses. In order that the trace of the cathode ray may extend a sufficient distance to provide accurate identification of echo and range measurement it is necessary to employ fairly large cathode ray tubes, which require relatively high deflection potentials to carry the cathode ray fully across the screen. For example, it is not at all uncommon to employ sweep voltages having peaks in excess of 1000 or 1500 volts on cathode ray tubes of six inches screen diameter, as the saw-tooth wave generators of conventional design are capable of producing waves whose peak potential does not exceed direct current potential of their power supplies, the operation of these larger cathode ray tubes has required bulky, heavy and relatively expensive equipment. However, where space and weight are at a premium, such as in submarines and aircraft, it is essential to reduce the size of every part of the radio echo ranging apparatus to the barest minimum, so that the conventional design of cathode ray sweep systems is not the most satisfactory.

The principal object of the invention is to provide a means for increasing the peak potential of the wave of a saw-tooth wave to a value substantially in excess of the power supply potential applied to the generator. Another object is to provide a cathode ray sweep system which can be operated from relatively low potential power supplies, and which is particularly adapted for use in radio echo range systems. Other objects will be apparent from the following description, having reference to the accompanying drawing.

In the drawing, the circuit comprises a saw-tooth wave generator including an electronic tube 100, a conventional power supply including a rectifier tube 200, an inverting circuit including a tube 300, a square wave generator including a tube 400 and a conventional scanning circuit including a cathode ray tube 500.

The saw-tooth wave generator may embody any of the usual means for generating saw-tooth waves, such as a relaxation circuit employing a gas discharge tube, but for accurate synchronization with radio pulse transmission the circuit shown is more satisfactory. In detail, the tube 100 is shown as a multi-grid tube of the high vacuum type, having anode 100a, cathode 100c, control grid 100g and screen grid 100s. The tube 100 is kept in a normally blocked condition by grounding the grid 100g through an impedance 101 and maintaining the cathode 100c positive with respect to ground by connecting it to an intermediate point on a resistance 201 of the power supply, the negative end of the resistance 201 being grounded. A capacitance 102 is connected from the anode 100a to ground, and it is charged by the positive potential of the power supply, applied from the high potential end of the resistance 201, through a resistance 103 and an inductance 104, to the anode 100a. The nature and significance of the inductance 104, which is the basis of this invention, are described in detail further on.

On receipt of a positive pulse on the grid 100g through a capacitance 105 the tube 100 becomes conducting and the capacitance 102 discharges As the pulse on the grid 100g fades out the tube 100 again becomes blocked and the capacitance 102 recharges through the resistance 103 and the inductance 104, thus generating a saw-tooth voltage wave at the point 106 if timed pulses are received by the grid 100g, or a single peaked wave if a single pulse is received. This wave is applied through a blocking capacitance 107 to one set of deflecting plates (e. g. one of the horizontal plates 501) of the cathode ray tube 500, proper bias being obtained from a variable tap 202 on the resistance 201, in conventional manner.

The saw-tooth wave applied to the plates 501 can be doubled in effective potential by utilizing part of the wave (appearing as a potential drop across the resistance 103, the damping effect of the inductance 104 on the wave being eliminated by a small by-pass capacitance 108) to drive a "class A" amplifier as an inverting circuit. This is the function of the tube 300, and its output is applied to the opposite one of the horizontal plates 501 in conventional manner. In addition the class "A" amplifier provides a balanced sweep and thus avoids loss of focus of the beam.

The purpose of the inductance 104 is to cause the capacitance 102 to overcharge to a potential far in excess of that available from the power supply, and therefore the inductance 104 is extremely large. In practice the inductance 104 is in excess of 100 henries, and in small radio echo range systems it is preferably between 500 and 700 henries. The effect of this inductance on the voltage wave appearing at the point 106 is to cause the wave to reach a peak of as much as several times the power supply potential, and then to fall to that potential, usually before the capacitance 102 is discharged again through the tube 100. The effect of the inductance 104 is illustrated approximately by the wave diagrams (A) and (B) of the potentials obtained at the point 106 with and without the inductance 104, respectively. The wave form obtained with the inductance 104 is nearly sinusoidal because the discharge circuit is less than critically damped. However, the deviation from linearity of the part which is used is less than the errors made in reading the time intervals indicated by the sweep on the screen or the resetting error of the equipment itself.

Due to the fact that, for the usual adjustment of the sweep circuit, the cathode ray will tend to damage the screen before the capacitance 102 is discharged and returns the ray for another sweep, it is desirable to employ some sort of blanking circuit for cutting off the beam current at all times except during the useful part of the sweep.

For this purpose the tube 400 and associated electrical parts constitute a square wave generator actuated by the discharge of the capacitance 102, in the same way as the tube 300 is driven. The space wave output of tube 400 may be used to derive either a positive square wave for the control, or intensity, grid 503 of the cathode ray tube 500, or a negative square wave for the cathode 504 of cathode ray tube 500. Since the square wave output of tube 400 is already negative during the useful portion of the sweep, this output voltage may be directly applied to cathode 504 of cathode ray tube 500 as in the embodiment shown in the drawings. This square wave unblocks the cathode ray tube 500 for the duration of the sweep, the cathode ray tube being normally blocked by maintaining the grid 503 sufficiently negative with respect to the cathode 504 by means of the potential gradient appearing across a power supply resistance 505 whose positive end is grounded. (As disclosed in U. S. Patent 2,303,924 granted to C. Faudell, December 1, 1942, applying a given beam intensity control voltage directly to the control grid of a cathode ray tube produces the same effect as a voltage applied directly to the cathode of such a device having the same wave shape as, but 180 degrees out of phase with the given voltage applied to the control grid thereof.)

As already has been indicated, a number of modifications may be made within the scope of the invention. The exact form of the sweep circuit is not important, and any type of saw-tooth wave generator may be employed which utilizes the charging (or discharging) of a capacitance to develop the saw-tooth wave, the large inductance being placed in the charging (or discharging) circuit of the capacitance to cause the resulting voltage wave to reach a peak potential substantially in excess of the direct current charging voltage available. Any type of square wave generator or blanking circuit may be employed to limit the cathode ray trace to the part desired, and the combination of such a blanking circuit and a saw-tooth wave generator utilizing the large inductance described is particularly suited for radio echo range finding equipment.

Many variations will be apparent to those skilled in the art, and the invention should not be limited other than as defined by the appended claims.

The invention described herein may be manufactured and used by or for the Government of the United States of America for governmental purposes without the payment of any royalties thereon or therefor.

I claim:

1. A sweep system comprising a cathode ray tube having independent horizontal and vertical deflecting means, a saw-tooth generator connected to said tube so as to sweep the cathode ray across the screen of said tube, said generator including a time constant circuit forming a capacitance and an impedance and means for periodically discharging said capacitance, said impedance including an inductance through which said capacitance is charged, said inductance forming with said capacitance a resonant circuit whose frequency of oscillation is equal to a substantial fraction of the repetition rate of said saw-tooth wave generation, and means including a square wave pulse generator coupled to said saw-tooth wave generator and operative to render said cathode ray tube visible only during the sweep of said cathode ray tube.

2. A control circuit for a cathode ray tube having beam deflection means and beam intensity control means comprising a sawtooth wave generator coupled to said beam deflection means for causing the beam of said cathode ray tube to gradually sweep across the face of said tube in a first given direction and to quickly return across the face of said tube, means coupled to said beam intensity control means for normally blanking said beam, means coupled between said sawtooth wave generator and said beam intensity control means responsive to the sawtooth wave output of said generator to provide a square wave of voltage during the beam sweep in said first given direction for unblanking said beam.

LA VERNE R. PHILPOTT.

REFERENCES CITED

The following references are of record in the file of this patent:

UNITED STATES PATENTS

| Number | Name | Date |
| --- | --- | --- |
| 1,933,219 | Nakajima et al. | Oct. 31, 1933 |
| 2,074,495 | Vance | Mar. 23, 1937 |
| 2,084,157 | McLennan | June 15, 1937 |
| 2,085,402 | Vance | June 29, 1937 |
| 2,153,655 | Urtel et al. | Apr. 11, 1939 |
| 2,188,653 | Faudell | Jan. 30, 1940 |
| 2,222,943 | George | Nov. 26, 1940 |
| 2,244,003 | Eaglesfield et al. | June 3, 1941 |
| 2,285,043 | Messner | June 2, 1942 |
| 2,363,810 | Schrader et al. | Nov. 28, 1944 |
| 2,400,113 | Haine | May 14, 1946 |
| 2,405,069 | Tonks | July 30, 1946 |
| 2,419,118 | Christaldi et al. | Apr. 15, 1947 |

FOREIGN PATENTS

| Number | Country | Date |
| --- | --- | --- |
| 400,976 | Great Britain | Nov. 6, 1933 |
| 474,683 | Great Britain | Nov. 4, 1937 |

OTHER REFERENCES

Time Bases by Puckle: published by John Wiley & Sons, Inc.; New York, pages 22 thru 25. Copy in Div. 54.